United States Patent [19]

Matsui et al.

[11] Patent Number: 5,906,259
[45] Date of Patent: May 25, 1999

[54] PARKING ROD IN PARKING LOCK DEVICE OF AUTOMATIC TRANSMISSION

[75] Inventors: Hideki Matsui, Kosai; Katsuhiko Saito, Fujinomiya, both of Japan

[73] Assignee: Fujikiko Kabushiki Kaisha, Tokyo, Japan

[21] Appl. No.: 08/844,194

[22] Filed: Apr. 18, 1997

[30] Foreign Application Priority Data

Apr. 19, 1996 [JP] Japan .................................... 8-098565

[51] Int. Cl.$^6$ ............................. B60K 41/26; B60T 1/06
[52] U.S. Cl. ........................ 192/219.5; 74/107; 74/411.5
[58] Field of Search ................................ 192/4 A, 219.5; 74/411.5, 107, 577 S; 188/31, 69

[56] References Cited

U.S. PATENT DOCUMENTS

| 2,875,856 | 3/1959 | Mrlik et al. ......................... 192/4 A X |
| 4,223,768 | 9/1980 | Iwanaga ................................. 192/4 A |
| 4,576,261 | 3/1986 | Barr ....................................... 192/4 A |
| 4,727,967 | 3/1988 | Ogasawara et al. .................... 192/4 A |

*Primary Examiner*—Richard M. Lorence
*Attorney, Agent, or Firm*—Howard & Howard

[57] ABSTRACT

A parking rod for a parking lock device of an automatic transmission comprises a straight-shaped parking rod main body portion, and an applied force transmitting portion formed continuously at the base portion side of the parking rod main body portion. The applied force transmitting portion is formed flat and has a linking portion arranged at the base portion side formed to curve so as to engage with the linking portion at the transmission mechanism side for transmitting the applied force from the shift lever.

4 Claims, 4 Drawing Sheets

EXPRESS MAIL #EM583156231US
FIG.3
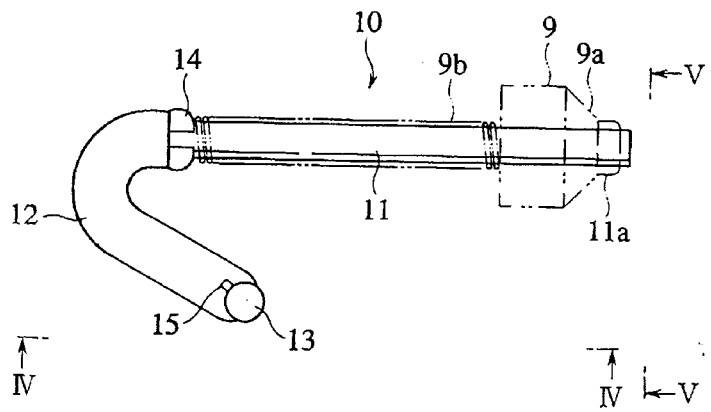
FIG.4
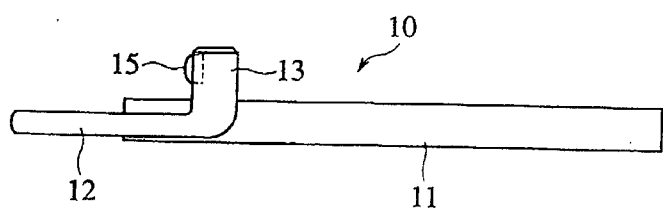
FIG.5
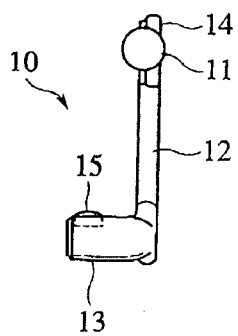

PARKING ROD IN PARKING LOCK DEVICE OF AUTOMATIC TRANSMISSION

BACKGROUND OF THE INVENTION

The present invention relates to a parking rod in a parking lock device of an automatic transmission for transmitting the applied force from a shift lever to a parking gear via a parking pole. The invention also includes a production method thereof.

A known parking lock device comprises a parking gear having a plurality of stopping grooves on the outer periphery which is fixed on a drive shaft supported rotatably in a transmission case. A parking pawl has stopping projecting portions for engagement with the stopping grooves. The parking pawl is rotatably supported in the vicinity of the parking gear.

A shift lever is rotatably supported at the vehicle body side so that the applied force of the shift lever is transmitted to a transmission mechanism comprising a link mechanism. Since the transmission mechanism is also linked with the parking rod, the parking rod rotates in accordance with the rotation of the shift lever. By rotation of the parking rod, a cam member provided at the tip portion of the parking rod rotates the parking pawl so that the parking gear engages with the parking pole for stopping rotation of the drive shaft through the parking gear.

The transmission mechanism and parking rod are linked via an applied force transmitting portion and a link pin embedded therein. Since the parking rod, the applied force transmitting portion and the link pin are individual parts, the applied force transmitting portion needs to be welded to the parking rod. Consequently, there are problems such as increase of weight of the device due to the increase of the number of constituent parts. There is also an increase in production cost due to the production processes in welding and due to the necessity of cutting off welding beads.

SUMMARY OF THE INVENTION

The present invention addresses the above-mentioned problems. An object of the present invention is to provide a parking rod in a parking lock device of an automatic transmission which is capable of reducing the number of constituent parts by integrally forming a parking rod from a straight-shaped material by deformation processing.

Another object of the present invention is to provide a parking rod in a parking lock device of an automatic transmission which reduces the number of production processes in welding.

Still another object of the present invention is to provide a parking rod in a parking lock device of an automatic transmission which eliminates the need for cutting off welding beads.

A method of making such an apparatus is also an object of this invention.

A parking rod in a parking lock device of an automatic transmission of the present invention comprises a parking rod main body portion of a straight shape for transmitting an applied force from a shift lever to a parking gear via a parking pole. An applied force transmitting portion is arranged at the opposite side with respect to the parking pawl of the parking rod main body portion for transmitting the applied force from the shift lever to the parking rod main body portion. The parking rod main body portion and the applied force transmitting portion are integrally formed continuously from a bar material.

In the above structure, it is preferable that the end portion opposite to the parking rod main body portion of the applied force transmitting portion is bent to form a substantially right angle so as to form a linking portion for engaging with a linking portion of a transmission mechanism for transmitting the applied force from the shift lever. It is also preferable that the applied force transmitting portion is formed flat.

In the above structure, it is further preferable that the applied force transmitting portion is formed to curve so that the linking portion of the applied force transmitting portion is able to engage with the linking portion of the transmission mechanism for transmitting the applied force from the shift lever.

Since the applied force transmitting portion and the linking portion thereof are formed integrally from a straight-shaped material by deformation processing, a welding process becomes unnecessary and the number of constituent parts can be reduced. Accordingly, cost reduction and lightweight are achieved.

A production method of a parking rod in a parking lock device of an automatic transmission of the present invention comprises the steps of: forming a linking portion for engaging with a linking portion of a transmission mechanism for transmitting the applied force from a shift lever by bending one end of a bar material already cut into a predetermined length; and forming an applied force transmitting portion positioned between a parking rod main body portion and the linking portion formed in the above-mentioned step with a curved shape. The parking rod main body portion for transmitting the applied force from the shift lever via a parking pole to a parking gear is kept in a straight shape, and the applied force transmitting portion is formed with curved shape so as to enable the linking portion of the applied force transmitting portion to engage with the linking portion of the transmission mechanism for transmitting the applied force from the shift lever.

In the above construction, it is preferable to include a further step of flattening the applied force transmitting portion to form a flat shape.

The above and further objects and novel features of the present invention will more fully appear from the accompanying drawings and the detailed descriptions of the preferred embodiments.

BRIEF DESCRIPTION OF THE DRAWINGS

FIG. 3 is a front view of a parking rod according to the present invention.

FIG. 4 is a diagram viewed from the direction taken along the line IV—IV of FIG. 3.

FIG. 5 is a diagram viewed from the direction taken along the line V—V of FIG. 3.

DETAILED DESCRIPTION OF THE PREFERRED EMBODIMENTS

A parking rod in a parking lock device of an automatic transmission of the present invention and a production method thereof will be described with reference to the drawings.

Figures 1, 2:
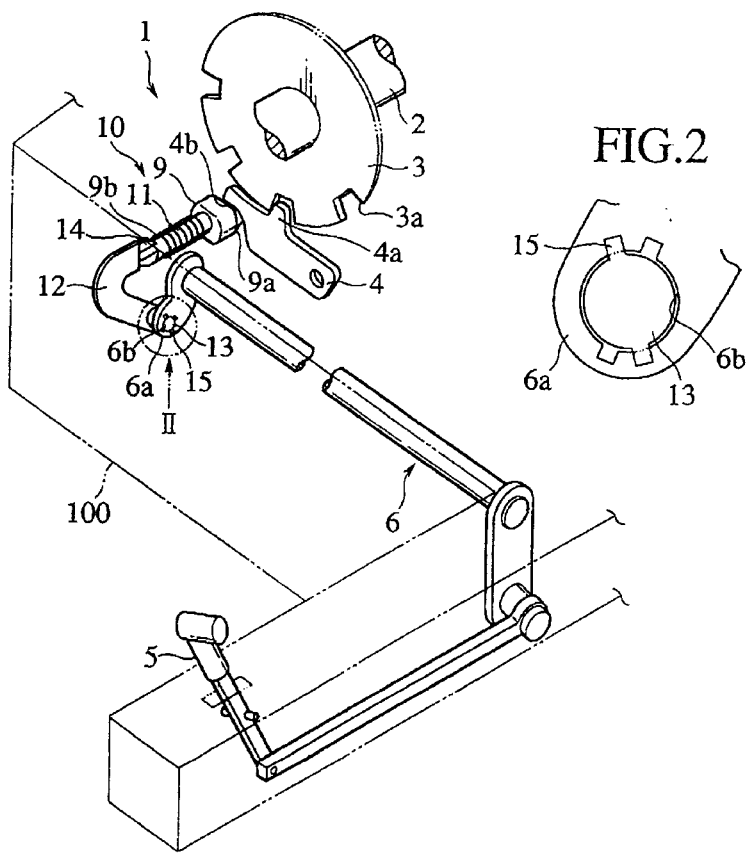
FIG. 1 is a perspective diagram of a parking lock device of an automatic transmission comprising a parking rod according to the present invention.
FIG. 2 is an enlarged diagram of the portion II of FIG. 1.

As shown in FIG. 1, in a parking lock device comprising a parking rod according to the present invention, a parking gear has a plurality of stopping grooves 3a on its outer periphery. Gear 3 is fixed to a drive shaft 2 rotatably supported in a transmission case 100. A parking pole 4 has a stopping projecting portion 4a for engaging with the stopping grooves 3a. Pole 4 is rotatably supported in the vicinity of the parking gear 3.

A shift lever 5 is rotatably supported at the vehicle body side so that the applied force of the shift lever 5 is transmitted to a transmission link mechanism 6. A parking rod 10 is arranged at a linking portion 6a, which is the output end of the transmission mechanism 6.

The parking rod 10 according to the present invention is for a parking lock device 1 of an automatic transmission for transmitting the applied force of a shift lever 5 to a parking gear 3 via a parking pole 4. The parking rod 10 comprises a straight-shaped parking rod main body portion 11, and an applied force transmitting portion 12 formed continuously at the base portion side of the parking rod main body portion 11 for transmitting the applied force of the shift lever 5 to the parking rod main body portion 11. The applied force transmitting portion 12 is formed flat. A linking portion 13 which is disposed at the base portion side is formed to curve so as to engage with the linking portion 6a at the transmission mechanism 6 side for transmitting the applied force from the shift lever 5.

A cam member 9 has a tapered portion 9a for engaging with a cam receiving portion 4b formed in the parking pawl 4. Cam 9 is inserted to the other end side of the parking rod 10 while being limited by a stopper (not illustrated) with respect to the movement in the axial direction at the parking pawl 4 side. The cam member 9 is forced toward the parking pawl 4 side by a compression spring 9b.

By the shift operation of the shift lever 5, the parking rod main body portion 11 is moved aixal via the linking portion 6a at the transmission mechanism 6 side and the power transmitting portion 12. The parking pawl 4 is then rotated by the cam member 9 arranged in the parking rod main body portion 11 so that the stopping projecting portion 4a can engage with the stopping groove 3a of the parking gear 3.

A configuration of the present invention will be described in further details.

A parking rod 10 is formed by a round-bar material, comprising a straight-shaped parking rod main body portion 11, a flat applied force transmitting portion 12 formed continuously from the parking rod main body portion 11, an a linking portion 13 formed so as to curve toward the base portion side of the applied force transmitting portion 12. The linking portion 13 of the applied force transmitting portion 12 is engaged by being inserted to a hold 6b formed in the linking portion 6a of the transmission mechanism 6 as shown in FIG. 2.

As shown in FIGS. 3 and 5, a spring receiving portion 14 is formed by coining both sides at the linking portion between the parking rod main body portion 11 and the applied force transmitting portion 12. As illustrated in FIGS. 3, 4, and 5, a stopper 15 is formed at the tip portion of the linking portion 13 by coining one side for stopping the linking portion 13 at the transmission mechanism 6 side.

As illustrated in FIG. 2, the stopper 15 prevents slipping off of the linking portion 6a by inserting the linking portion 13 into the hole 6b of the linking portion 6a having notches through which the stopper 15 can be placed. There may be only one stopper 15 as shown in FIGS. 3, 4, 5, 6F and 7 or plural stoppers as shown in FIGS. 1 and 2.

As illustrated in FIG. 3, the compression spring 9b and the cam member 9 are inserted to the parking rod main body portion 11, and a stopper 11a is formed by crushing the tip portion of the parking rod main body portion 11. Accordingly, the cam member 9 is always forced toward the parking pawl 4 side by the compression spring 9b as well as limited in terms of the movement in the axial direction at the parking pawl 4 side by the stopper 11a. This prevents slipping off from the parking rod main body portion 11.

Figure 6A:
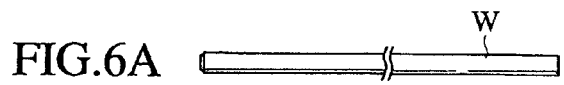
FIG. 6A to 6F are diagrams illustrating the steps of production processes of a production method of a parking rod according to the present invention.
Figure 6B:
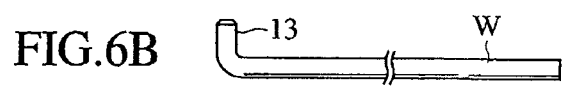
Figure 6C:
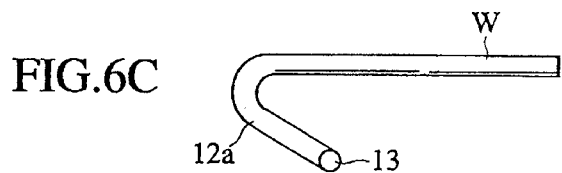
Figure 6D:
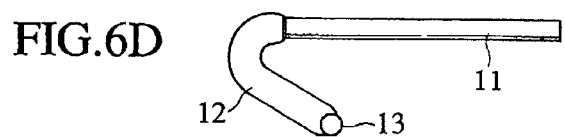

A production method of a parking rod 10 of the present invention comprises a plurality of processing stages as illustrated in FIGS. 6A to 6F. As shown in FIG. 6B, as a first step, one end of a straight-shaped material cut into a predetermined length, such as a round-bar material W (FIG. 6A) is bent so as to form the linking portion 13 for receiving the applied force from the shift lever 5 side. Then as shown in FIG. 6C, in a second step, the portion 12a corresponding to the applied force transmitting portion 12 of the material W obtained by the first step is curved to engage with the linking portion 6a at the transmission mechanism 6 side for transmitting the applied force from the shift lever 5. As shown in FIG. 6D, in a third step, the portion 12a corresponding to the applied force transmitting portion 12 formed by curving in the second step is flattened by pressing so as to form the applied force transmitting portion 12 and the parking rod main body portion 11.

Figure 6E:
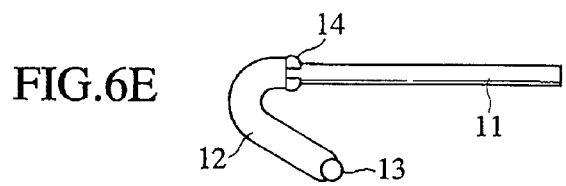
Figure 6F:
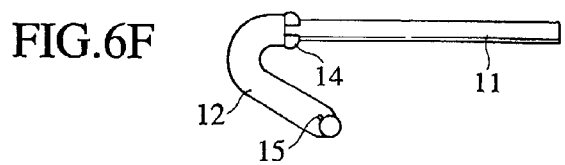

As illustrated in FIG. 6E, the spring receiving portion 14 is formed at the linking portion of the parking rod main body portion 11 and the applied force transmitting portion 12 by coining both sides. And as illustrated in FIG. 6F, the stopper 15 is formed at the tip portion of the linking portion 13 by coining one side.

Figure 7:
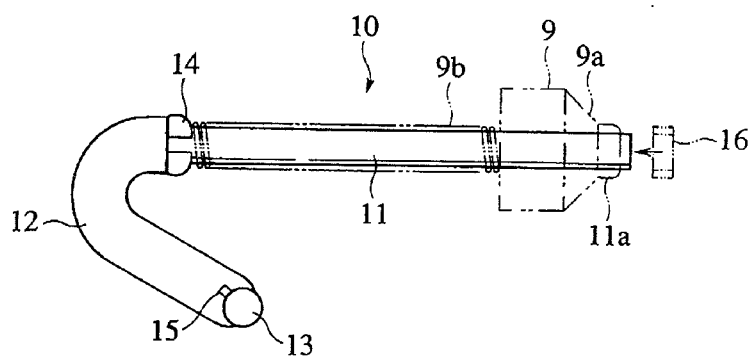
FIG. 7 is a front view of another embodiment of a means for engaging a cam member to a parking rod.

As mentioned above, in the parking rod 10 and production method thereof according to the present invention, the applied force transmitting portion 12 and the linking portion 13 are formed integrally by deformation processing of a straight shaped material W. Accordingly, a welding process becomes unnecessary as well as the number of constituent parts are reduced. Thus, cost and weight reduction can be achieved. Since the applied force transmitting portion 12 is flattened by deformation processing, modulus of section can be improved as well as the strength can be dramatically improved by work hardening. The strength in the flattened transverse direction can be dramatically improved. Moreover, since one side of the linking portion of the applied force transmitting portion 12 and the linking portion 13 is formed at substantially a right angle, an engaging margin of the linking portion 6a can be obtained even if the projecting portion of the linking portion 13 is small. Thus downsizing and weight reduction can be realized. Also, since the applied force transmitting portion 12 can be made dramatically smaller than conventional ones, it is very advantageous in terms of layout. Furthermore, according to another embodiment, as shown in FIG. 7, a stopper 11a can be formed by inserting a collar 16 into the tip portion of the parking rod main body portion 11 and fixing the collar and the tip portion of the parking rod main body portion 11 by welding. Accordingly, the cam member 9 is always forced toward the parking pawl 4 side by the compression spring 9b as well as limited in terms of the movement in the axial direction at the parking pawl 4 side by the stopper 11a so as to prevent slipping off from the parking rod main body portion 11.

Since it is apparent that different embodiments can be effected in a wide range without departing from the spirit and scope of the invention, the invention is not limited to the specific embodiments except for limitation made by the accompanying claims.

We claim:

1. A parking rod for a parking lock device of an automatic transmission comprising:

a parking rod main body portion of a straight shape for transmitting an applied force from a shift lever to a parking gear via a parking pawl;

an applied force transmitting portion arranged an the opposite side with respect to said parking pawl of the parking rod main body portion for transmitting the applied force from the shift lever to the parking rod main body, the applied force transmitting portion having a linking portion at the end portion opposite to the parking rod main body portion of the applied force transmitting portion, the linking portion of the applied force transmitting portion being adapted for engaging with another linking portion of a transmission mechanism for transmitting the applied force from the shift lever, wherein said applied force transmitting portion is bent with an acute angle so that said linking portion of the applied force transmitting portion may be engaged with the other linking portion of the transmission mechanism for transmitting the applied force from the shaft lever.

2. The parking rod of claim 1, wherein said applied force transmitting portion is flattened so as to be a thin plate.

3. The parking rod as recited in claim 2, wherein said linking portion of the applied force transmitting portion is bent to form a substantially right angle with respect to the parking rod main body portion.

4. The parking rod as recited in claim 3, wherein said parking rod main body portion and the applied force transmitting portion including the linking portion of the applied force transmitting portion are integrally formed from bar material.

* * * * *